July 14, 1970   E. G. HILL   3,520,203
POSITIONING DEVICE
Filed Nov. 15, 1968   2 Sheets-Sheet 1

EDWARD GRANT HILL
INVENTOR.

BY
ATTORNEYS.

July 14, 1970  E. G. HILL  3,520,203
POSITIONING DEVICE
Filed Nov. 15, 1968  2 Sheets-Sheet 2

EDWARD GRANT HILL
INVENTOR.

BY
ATTORNEYS.

United States Patent Office 3,520,203
Patented July 14, 1970

3,520,203
POSITIONING DEVICE
Edward Grant Hill, Santa Susana, Calif., assignor, by mesne assignments, to EG&G, Inc., Bedford, Mass., a corporation of Massachusetts
Filed Nov. 15, 1968, Ser. No. 776,075
Int. Cl. F16h 25/02; G02b 7/02
U.S. Cl. 74—89.15                    9 Claims

ABSTRACT OF THE DISCLOSURE

The precise adjustment of the position of a member, such as a mirror or lens in an optical system, is accomplished by connecting the member, through suitable means, to a body of deformable and incompressible elastic material. A relatively small diameter piston or rod is then inserted into the body of elastic material so as to deform the body and alter at least one dimension thereof by minute amounts. The induced minute changes in the elastic, deformable body serve to change the position of the member.

BACKGROUND OF THE INVENTION

This invention relates to positioning devices and more particularly to a system for positioning a device wherein relatively coarse and relatively fine adjustment means moves the device, in translation, by minute amounts.

Heretofore, it has been the practice in, for example, optical systems and the like, to precisely position a member in the system by employing various combinations of screws and followers. The fine adjustment of position is usually accomplished by employing a fine adjustment screw and an associated follower riding on, or interconnected with, a similar mechanism for the coarse positioning of the member. Thus, the position of the member is maintained by reason of the engaging threads on the screw and the follower and unless positive contact is maintained between threads on the screw and the follower, for both directions of motion, positioning in each direction will not be positive. This condition is usually referred to as backlash. As the threads wear, the backlash increases.

Further, the fine positioning is often heavily dependent on the pitch of the thread on the screw, the rationale being that the finer the required fine adjustment, the finer the threads must be. Fine threads on screws are difficult to maintain as any small discontinuities or dirt in the thread will cause binding and poor operation. A system subject to wear in the threads of the adjustment mechanism and the attendant backlash is, therefore, highly unsuited for use in a device for positioning mirrors in, for example, an optical laser system where adjustments in the position of the mirror, of the order of 2–3 seconds of an arc will be required.

SUMMARY OF THE INVENTION

The present invention provides a device for accomplishing both coarse and fine adjustment, in the position of a member, using a concept analogous to fluid mechanics in which two pistons of different diameters work against a body of elastic material that may be deformed while maintaining a substantially constant volume. In my device, a smaller piston is made to project into a body of elastic or deformable material resulting in a noncompressing deformation of the material that is accompanied by relatively small dimensional changes in the material. It is the small changes that are transmitted to the positioned member as a fine adjustment, resulting in the repositioning of the positioned member.

It is, therefore, one object of the present invention to provide a positioning device which is not subject to the backlash of the prior art devices.

Another object of the present invention is to provide a device for finely adjusting the position of a member, noted by the fact that motion is not transmitted directly to the member by gears, threads, pulleys or similar mechanical devices that may be subject to wear and backlash.

Still another object of the present invention is to provide a device for finely adjusting the position of a member by making use of relatively small dimensional changes in a body of elastic material which occur when the material is deformed.

Yet another object of the present invention is to provide a device capable of performing coarse and fine adjustments in position of a lens or mirror in an optical system.

The features of my invention which I believe to be novel are set forth with particularity in the appended claims. The invention itself, however, both as to its organization and method of operation, together with further objects and advantages thereof, may best be understood by reference to the following description of the embodiments taken in conjunction with the accompanying drawings.

DETAILED DESCRIPTION OF THE PREFERRED EMBODIMENTS

Figure 1:
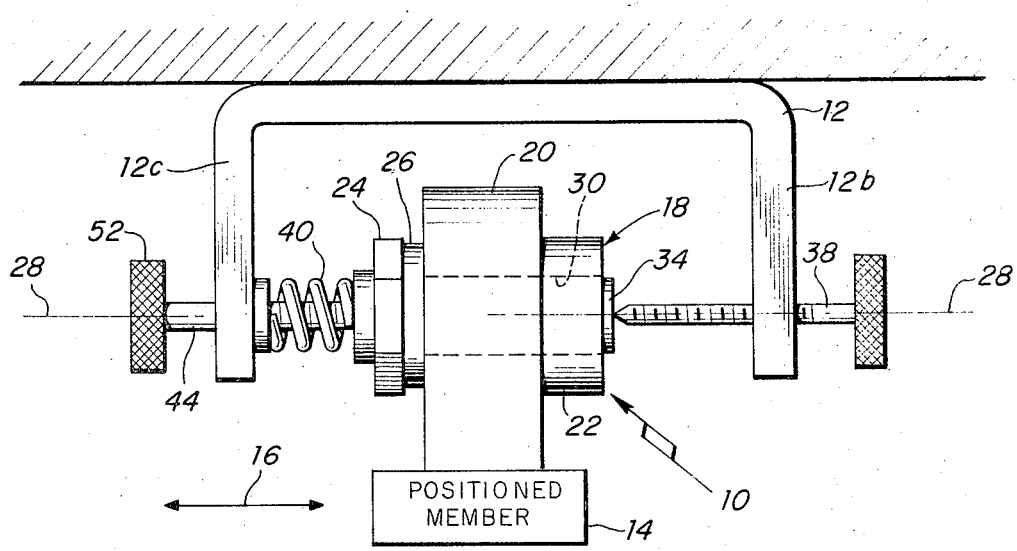
FIG. 1 is a plan view of one embodiment of the invention in which the coarse and fine adjustment of a positioned body is accomplished by manipulating oppositely directed pistons of different size.
Figure 2:
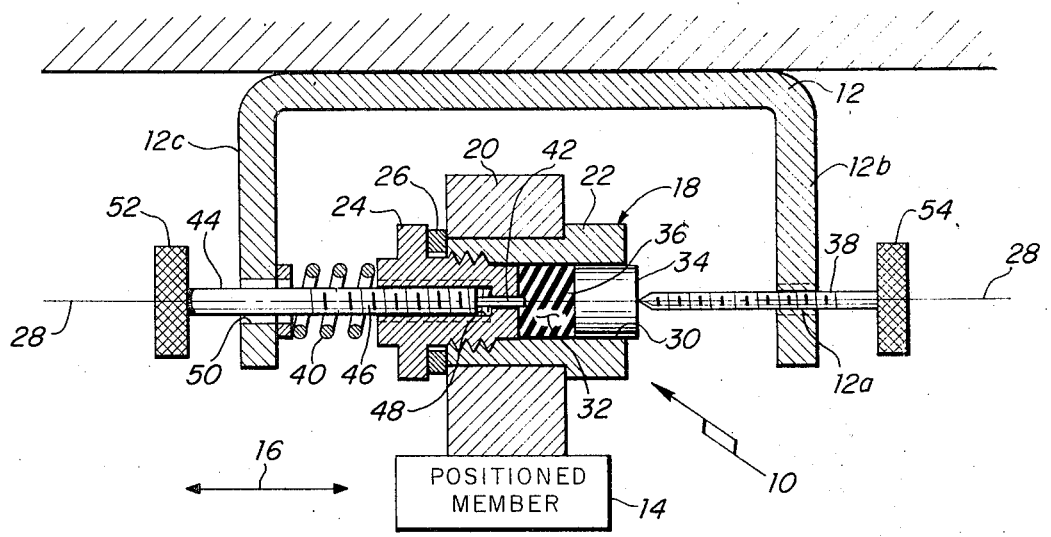
FIG. 2 is a sectional plan view taken through the axis of the oppositely directed pistons.

Referring now to FIGS. 1 and 2, there is shown a plan view of a positioning device 10 mounted within a fixed, U-shaped frame 12, for positioning positioned or moveable member 14 relative to frame 12, in a direction indicated by double headed arrow 16. Frame 12 may be attached to a floor, table or in any other fixed reference position with respect to which positioned member 14 is to be positioned.

Positioning mechanism 10 consists of housing assembly 18 to which positioned member 14 is fixedly attached by means of yoke 20. Housing assembly 18 comprises three parts, as shown in more detail in FIG. 2, namely: bored cylinder 22; plug 24 and lock washer 26, all of which are coaxially disposed along axis 28 of positioning device 10. Plug 24 threadably engages one end of bore 30 which bore extends through cylinder 22 and defines one end of cylindrical cavity 32. Piston 34, slideably fitted in bore 30, defines the other end of cylindrical cavity 32 and may project slightly beyond the end of the cylinder 22. Deformable body 36 is disposed within cylindrical cavity 32 to substantially fill the cavity and usually consists of material having a hardness preferably in the range of about 10 to 15 Shore. As will be obvious to those skilled in the art, body 36 may be made of natural or artificial rubber or any other suitable deformable elastic material that maintains a substantially constant volume when subjected to deforming forces.

The coarse adjustment is provided by means of threaded screw 38 which passes through an appropriately threaded aperture 12a in arm 12b of U-frame 12. The other end of screw 38 bears against piston 34, so that forces which are transmitted by screw 38 to piston 34 are delivered against a relatively large area of the body of elastic material 36. These forces are opposed by spring 40 which is disposed between plug 24 and arm 12c of frame 12.

The pressure of piston 34, against the body of elastic material 36, is delivered to plug 24 and a fine adjustment piston or rod 42 located at one end of fine adjustment screw 44. Screw 44 is provided with a threaded portion 46 that is coaxial with threaded bore 48 of plug 24. Fine adjustment screw 44 is located coaxially with respect to spring 40 and both are coaxial with respect to axis 28 of mechanism 10. To perform its function, clearance hole 50 is provided in arm 12c of frame 12 so that threaded portion 46 of fine adjustment screw 44 can clear arm 12c of frame 12, and knob 52 can be easily manipulated. The cooperation of threads 46, of fine adjustment screw 44, with the mating threads in threaded aperture 48 in plug 24, together with coarse adjustment screw 38, which is threadably connected to frame 12 so as to abut piston 34, all serve to suspend positioning mechanism 10 within frame 12.

Spring 40 is selected to have a particular stiffness that is somewhat greater than the strain characteristics of body 36 such that body 36 will tend to deform under pressures exerted on it by piston or rod 42. Any forces applied to body 36 forces it to continuously fill the cavity, while also acting to move the cavity plug 24 against spring 40.

In operation, fine adjustment screw 46 and piston 42 may be rotated into or out of plug 24 so as to vary the amount of volume displaced by piston 42 in cavity 32, and hence, the amount of compensating movement produced by plug 24 which is being acted upon by elastic and incompressible body 36. As piston 42 is moved into cavity 32 to deform body 36, a pressure is exerted on plug 24 by the deformation of body 36 causing plug 24 to move in opposition to compression spring 40. When piston 42 is retracted in a direction away from body 36, elastic body 36 will tend to assume its original configuration, forcing spring 40 to move plug 24, and its associated parts, in the opposite direction. It should thus be apparent that all positioning of positioned member 14 may be accomplished by either rotating knob 54 of coarse adjustment screw 38 or by rotating fine adjustment knob 52. Since spring 40 is arranged between plug 24 and arm 12c, a constant pressure is applied to mechanism 10 driving it and positioned member 14 to the right, toward coarse adjustment screw 38. However, positioned member 14 may be moved to the left or the right, solely by the manipulation of coarse adjustment screw 38, so as to position member 14 to a point on a line parallel to axis 28, a distance equal to the displacement of coarse adjustment screw 38 relative to arm 12b. On the other hand, when screw 44 is rotated so that piston 42 is inserted into cavity 32 to project into the body of elastic material 36, the body of elastic material 36 will tend to be deformed; will exert pressure against fine adjustment piston 42 and plug 24; and will force the latter, housing member 18 and positioned member 14 to move in a direction toward arm 12c. Since piston 34 bears directly against coarse adjustment screw 38, the interfacing surfaces of elastic body 36 and piston 34 will remain fixed and the only movement that can be made will be made by housing member 18, in a direction toward arm 12c and against the pressure of spring 40. The distance housing member 18 and positioned member 14 is moved depends, essentially, upon the distance which rod 42 is inserted into elastic body 36, as well as the ratio of the diameter of piston 42 to the diameter of bore 30. In this manner, it will be necessary to insert rod 42 into body 36 relatively deeply to produce a substantially smaller movement of housing member 18 and positioned member 14. It is thus possible to achieve movement, of positioned member 14, of the order of 2–3 seconds of an arc by a comparatively gross rotation of fine tuning screw 46.

It will generally be preferred to initially adjust coarse adjustment screw 38 by turning knob 54, after fine adjustment screw 44 has previously been adjusted, so that the rod 42 projects into the body of elastic material 36. Thereafter, any fine adjustment in either direction may be made by manipulating knob 52 on the fine adjustment screw to bring positioned member 14 to a precise position.

Figure 3:
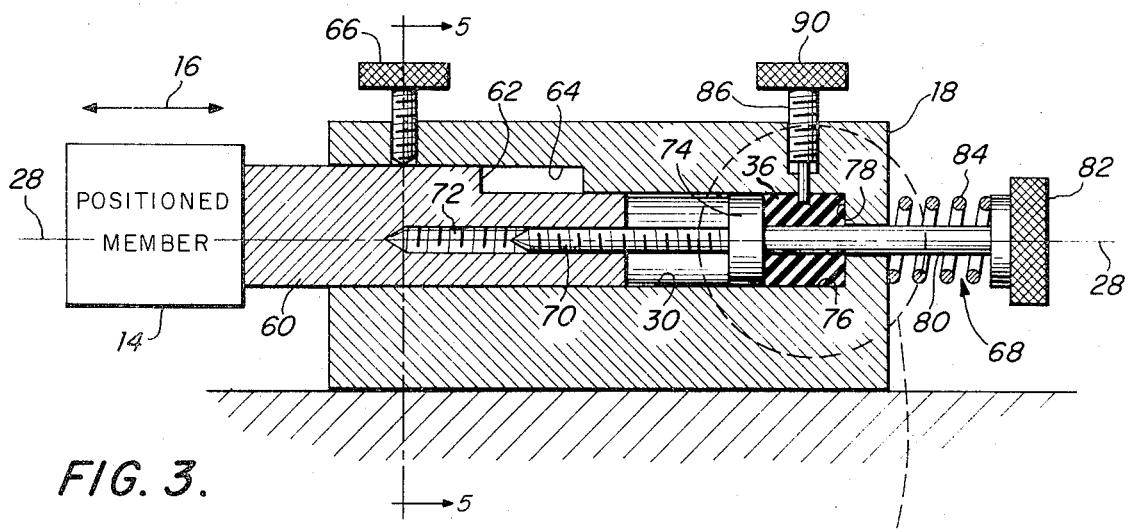
FIG. 3 is a sectional view of another embodiment in which the coarse and fine adjustment pistons are orthogonally directed.
Figure 4:
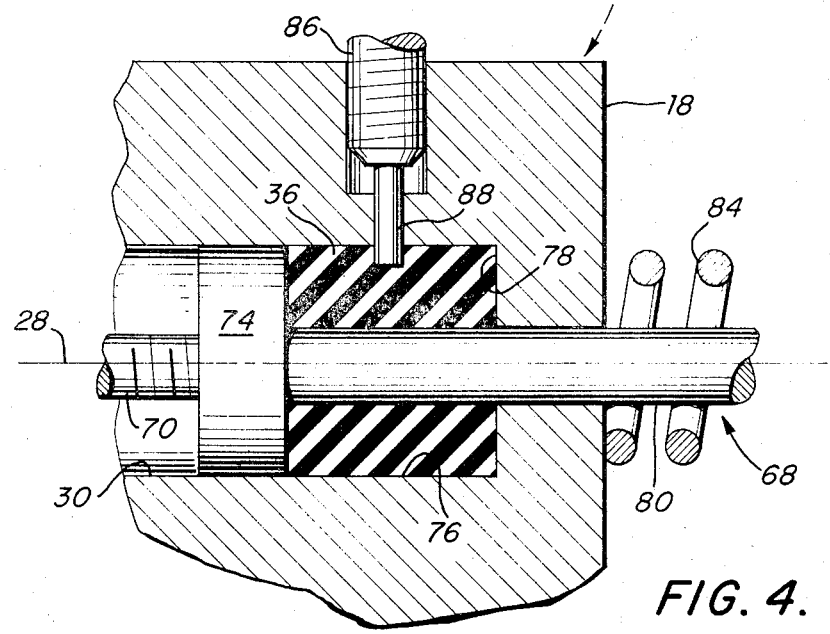
FIG. 4 is an enlarged view of a portion of FIG. 3.
Figure 5:
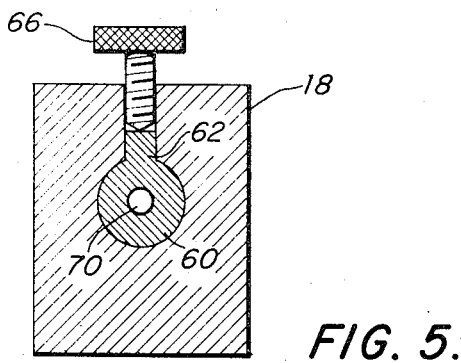
FIG. 5 is a sectional view, taken along lines.

The embodiment illustrated in FIGS. 3, 4 and 5 relates to coarse and fine positioning of a positioned member that is accomplished by bringing relatively large and small area pistons to bear on a body of incompressible elastic material in orththogonal directions. More particularly, a small piston, for performing a fine adjustment function, is brought to bear on the elastic material in a direction transverse to the translational positioning of the positioned member. By so doing, dimensional changes of the elastic body while maintaining a constant volume are introduced as a result of deformation of the elastic body by the fine adjustment piston and are orthogonal to the direction of movement of the fine adjustment piston.

Referring now to FIGS. 3, 4 and 5 there is shown a side, sectional view of this other embodiment wherein housing 18' is provided with an axial bore 30' and accommodates keyed piston 60 which slideably fitted in bore 30'. Piston 60 is fitted to slide freely along axis 28' of bore 30', in the directions of double headed arrow 16', and has positioned member 14' connected to the free end thereof to directly engage and support positioned member 14'. Keyed portion 62 is provided along the length of a portion of piston 60 and slideably fits into keyway 64 which has been machined on the inside of bore 30'. Keyway 64 and keyed portion 62, or an equivalent mechanism, are provided to prevent piston 60 from rotating about axis 28' within bore 30'. The position of piston 60 in housing 18' is fixed by threaded set screw 66 which is made to bear against keyed portion 62 of piston 60.

To operate this embodiment, set screw 66 is first released and the position of the piston 60 in bore 30' is adjusted by turning coarse adjustment screw 68. Since screw 68 has been provided with a threaded portion 70 to engage threaded portion 72 of piston 60, initial adjustment is rapidly accomplished, and piston 60 is moved, relative to the position of screw 68, by rotating the screw. Piston 74, attached to the end of shaft portion 80, is only slightly smaller than the diameter of bore 30' and defines one end of annular cavity 76. The other end of cavity 76 being defined by end wall 78 of bore 30'. Shaft portion 80 extends through cavity 76 and beyond end wall 78 of housing 18', and has a coarse adjustment knob 82 which is affixed to the end thereof.

Cavity 76 is substantially filled with a body of relatively incompressible elastic material 36', which may be rubber or the like, having a hardness in the range of about 10 to 15 Shore. Spring 84, arranged to be concentric with shaft portion 80 of coarse adjustment screw 68, acts between knob 82 and housing 18' to force piston 74 firmly against elastic material 36' and hold material 36' under slight compression.

Since the force of spring 84 will be substantially constant for any given setting, the compression under which elastic material 36' is held, by piston 74, will also remain constant, and the position of piston 74, in bore 30', is maintained relatively fixed. Thus, rotation of coarse adjustment screw 68, accomplished by rotating knob 82 one way or the other, causes threaded portion 70 to screw into or out of piston 60, and the distance screw 68 moves into or out of piston 60 will determine the coarse displacement in the position of positioned member 14'.

Fine adjustment in the position of positioned member 14', in the directions of arrows 16', is accomplished by loosening fine adjustment screw 86 which is threadably connected to housing 18'. Rotating fine adjustment screw 86, either in or out, drives piston or rod 88 into or out of annular cavity 76 causing rod 88 to project more or less deeply into the body of elastic material 36'. The deeper rod 88 projects into material 36', the more it deforms the material causing some slight change (increase) in the dimension of the material 36' as measured along axis 28'. This results in a slight shift in the position of piston 74 and equal shift in piston 60 and thus, the position of positioned member 14'. Thus, a relatively large translational movement of rod 88 into the body of elastic material 36' results in a relatively small translational movement of positioned member 14' in the direction of the double headed arrow 16'. In this manner, coarse and fine positioning of positioned member 14' is accomplished by manipulating knob 82 of coarse adjustment screw 68 and manipulating knob 90 on fine adjustment screw 86.

In both embodiments of the invention described herein, coarse and fine adjustments in the position of a positined member are accomplished by turning a screw so that the screw moves in translation axially, through an accommodating thread, to move a coarse or a fine piston in translation causing a piston to act against a body of elastic material whose motion is then imparted to the positioned member. Quite clearly, the translational motions of the coarse and fine pistons could be initiated by mechanisms other than a screw turned through an accommodating thread. For example, ratchets or gears could be used to initiate this motion. The screw and thread are convenient mechanisms, because they have high mechanical advantages as relatively large angular rotations of a screw results in only small axially translational motion of the screw.

It should be obvious to those skilled in the art that both the fine and the coarse adjusting screws act against a resisting force when they are operational. The screws are actively loaded against their accommodating threads at all times and the loads are always in the same direction. As a result, while the threads on the coarse and fine adjusting screws needs not be precisely machined or matched to their accommodating threads, and may even fit rather loosely therewith, it should be noted that backlash will not occur. This will insure that even the slightest rotation, in either direction of either the coarse or fine adjusting screws, will result in a change in the position of positioned member.

While there has been described what is presently considered the preferred embodiments of the invention, it should now be obvious to those skilled in the art that various other changes and modifications may be made therein without departing from the inventive concept contained herein, and it is, therefore, aimed to cover all such other changes and modifications that may fall within the true spirit and scope of the invention.

I claim:
1. A device for positioning and holding a moveable member at any of a plurality of desired positions along the length of a given axis, comprising:
hollow, elongated body means, the longitudinal axis of which is disposed along the given axis, the member coupled to the body means;
a body of elastic material contained within a portion of the hollow of the body means;
fixed bracket means;
first adjustment means adjustably coupled to the bracket means to position the body means, in a first direction along the axis, to approximately the desired position; and
second adjustment means positioned to bear against and deform the material;
the deformation of the material being such as to reposition the body means along the axis, in a direction opposite the first direction, to the exact desired position.

2. The device of claim 1 wherein:
the bracket means is U-shaped having a pair of arms and a connecting center portion, each arm supporting respective adjustment means;
the body means disposed and supported for positioning between the arms.
3. The device of claim 2 further comprising:
piston means slideably disposed within the hollow of the body means and positioned between the first adjustment means and the body of elastic material; and
spring means, coaxially disposed about the second adjustment means, between the body means and one of the pair of arms.
4. The device of claim 3, wherein:
the first adjustment means is a threaded rod for coarse adjustment, the threads thereof mating with complimentary threads on the given axis in the other of the pair of arms; and
the second adjustment means is a threaded rod for fine adjustment, the threads thereof mating with complementary threads on the given axis in the body means.
5. The device of claim 4, wherein:
the first and second adjustment means are both located on the given axis and are coarse and fine adjustments respectively.
6. The device of claim 1, further comprising:
piston means slideably disposed within the hollow of the body means, the member coupled thereto; and
the first adjustment means is a cylindrical, rod member having a threaded portion at one end thereof and disposed within the hollow of the body means along the given axis, the threads thereof mating with complementary threads in the piston means.
7. The device of claim 6, wherein:
the first adjustment means has a coaxial portion adjacent the threaded portion and a rod portion adjacent the coaxial piston portion;
the threaded portion, the piston portion and the rod portion disposed, in order, along the length of the first adjustment means;
the elastic material positioned between an end wall of the body means and the coaxial piston portion; and
the rod portion extending through the elastic material and through the end wall.
8. The device of claim 7, further comprising:
spring means coaxially disposed about the first adjustment means, between the body means and that portion of the rod portion extending through the elastic material and through the end wall.
9. The device of claim 8, wherein:
the second adjustment means is a threaded rod for fine adjustment, the threads thereof mating with complementary threads in the body means perpendicularly disposed with respect to the given axis, to bear against and to deform the body of elastic material; and
the threaded portion of the first adjustment means is the coarse adjustment.

References Cited
UNITED STATES PATENTS

| | | | |
|---|---|---|---|
| 1,498,117 | 6/1924 | Leonard | 350—255 |
| 2,521,256 | 9/1950 | Salter | 350—255 |
| 2,791,909 | 5/1957 | Rick | 74—89.15 |
| 2,900,494 | 8/1959 | Cheng | 240—10.66 |
| 3,209,367 | 9/1965 | Heden | 350—255 |
| 3,359,849 | 12/1967 | Friedman | 350—247 |
| 3,402,613 | 9/1968 | Neusel et al. | 74—89.15 |

WESLEY S. RATLIFF, Jr., Primary Examiner

U.S. Cl. X.R.

350—255

PO-1050
(5/69)

UNITED STATES PATENT OFFICE
CERTIFICATE OF CORRECTION

Patent No. 3,520,203          Dated July 14, 1970

Inventor(s)  Edward Grant Hill

It is certified that error appears in the above-identified patent and that said Letters Patent are hereby corrected as shown below:

Column 6, Claim 7, line 2, after "coaxial" insert --piston--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents